(12) United States Patent
Kot et al.

(10) Patent No.: US 7,913,725 B2
(45) Date of Patent: Mar. 29, 2011

(54) LOG DEFLECTOR WITH REMOVABLE ACCESSORY PORTION AND ASSOCIATED METHOD

(75) Inventors: Aleksander Kot, Langley (CA); Marin Preda, New Westminster (CA); Adrian M. Fengler, Aldergrove (CA); William Mark Wilkinson, Surrey (CA)

(73) Assignee: Deere-Hitachi Specialty Products, Aldergrove (CA)

( * ) Notice: Subject to any disclaimer, the term of this patent is extended or adjusted under 35 U.S.C. 154(b) by 789 days.

(21) Appl. No.: 11/677,835

(22) Filed: Feb. 22, 2007

(65) Prior Publication Data
US 2008/0202636 A1 Aug. 28, 2008

(51) Int. Cl.
*A01G 23/08* (2006.01)
(52) U.S. Cl. .......................... 144/4.1; 144/335
(58) Field of Classification Search .................. 144/335, 144/356, 357, 245.1, 378, 392; 56/17.4, 56/320.12; 37/301, 302; 414/729, 739, 740; 224/403, 405
See application file for complete search history.

(56) References Cited

U.S. PATENT DOCUMENTS

| | | | | |
|---|---|---|---|---|
| 1,848,025 A * | 3/1932 | Raby | ............................ | 40/607.12 |
| 2,769,501 A * | 11/1956 | Wagner | .......................... | 180/69.2 |
| 3,782,036 A * | 1/1974 | Clark et al. | ....................... | 49/502 |
| 3,805,859 A * | 4/1974 | Kessler et al. | .............. | 144/24.13 |
| 3,833,034 A * | 9/1974 | Menzel et al. | .................. | 144/4.1 |
| 4,262,651 A * | 4/1981 | Fajt | ................................. | 126/542 |
| 4,360,971 A * | 11/1982 | Fellmann | ....................... | 30/296.1 |
| 4,611,824 A * | 9/1986 | McIntosh | ....................... | 280/748 |
| 5,035,458 A * | 7/1991 | Boensch | ........................ | 296/1.05 |
| 5,669,332 A * | 9/1997 | Riley | .............................. | 119/724 |
| 5,780,761 A * | 7/1998 | Musante et al. | .............. | 89/36.08 |
| 6,086,122 A * | 7/2000 | Dieterich et al. | .............. | 293/115 |
| 6,128,823 A * | 10/2000 | Young | ........................... | 30/121.5 |
| 6,343,799 B1 * | 2/2002 | Moyer | ........................ | 280/6.154 |
| 6,837,326 B2 * | 1/2005 | Haun et al. | .................... | 180/68.6 |
| 7,172,229 B2 * | 2/2007 | Gorbet | .............................. | 294/49 |
| 2005/0230985 A1 * | 10/2005 | Thiele, Jr. | ......................... | 294/49 |

OTHER PUBLICATIONS

Highline Portafab, www.hpf.com/guarding.asp, 2005.*
2004 John Deere 2054 Log Loader Sales Brochure, 2004.*
Madill H2200B Harvester Brochure, Feb. 19, 2004, 2 pages.
Background Information (3 pages) (prior art).

* cited by examiner

*Primary Examiner* — Dana Ross
*Assistant Examiner* — Jennifer Chiang
(74) *Attorney, Agent, or Firm* — Taylor IP, P.C.

(57) ABSTRACT

A forestry work machine comprises a carrier and a log deflector for deflecting away from the carrier a log held by the forestry work machine. The log deflector comprises a base portion attached to a side of the carrier and an accessory portion projecting laterally outwardly from and removably attached to the base portion. An associated method is disclosed.

11 Claims, 5 Drawing Sheets

LOG DEFLECTOR WITH REMOVABLE ACCESSORY PORTION AND ASSOCIATED METHOD

FIELD OF THE DISCLOSURE

The present disclosure relates log deflectors provided onboard forestry work machines.

BACKGROUND OF THE DISCLOSURE

Forestry work machines, such as forestry swing machines, may include a log deflector (also known as a log guard). Such a log deflector is used to deflect away from a carrier of the forestry work machine a log held by the forestry work machine. In this way, the log deflector reduces the risk that the log will strike the carrier.

Typically, the log deflector is located on a side of the carrier. A projecting portion of the deflector extending laterally outwardly relative to the carrier adds to the overall width of the machine and reduces versatility and serviceability.

SUMMARY OF THE DISCLOSURE

According to the present disclosure, there is provided a forestry work machine. The forestry work machine comprises a carrier and a log deflector for deflecting away from the carrier a log held by the forestry work machine. The log deflector comprises a base portion attached to a side of the carrier and an accessory portion projecting laterally outwardly from and removably attached to the base portion. An associated method is disclosed.

The removability feature of the accessory portion facilitates repair, replacement, servicing, and versatility for the end user. In addition, since the accessory portion may represent the widest point on the machine, removal of the accessory portion may enhance use and/or transport of the machine in relatively narrow places.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
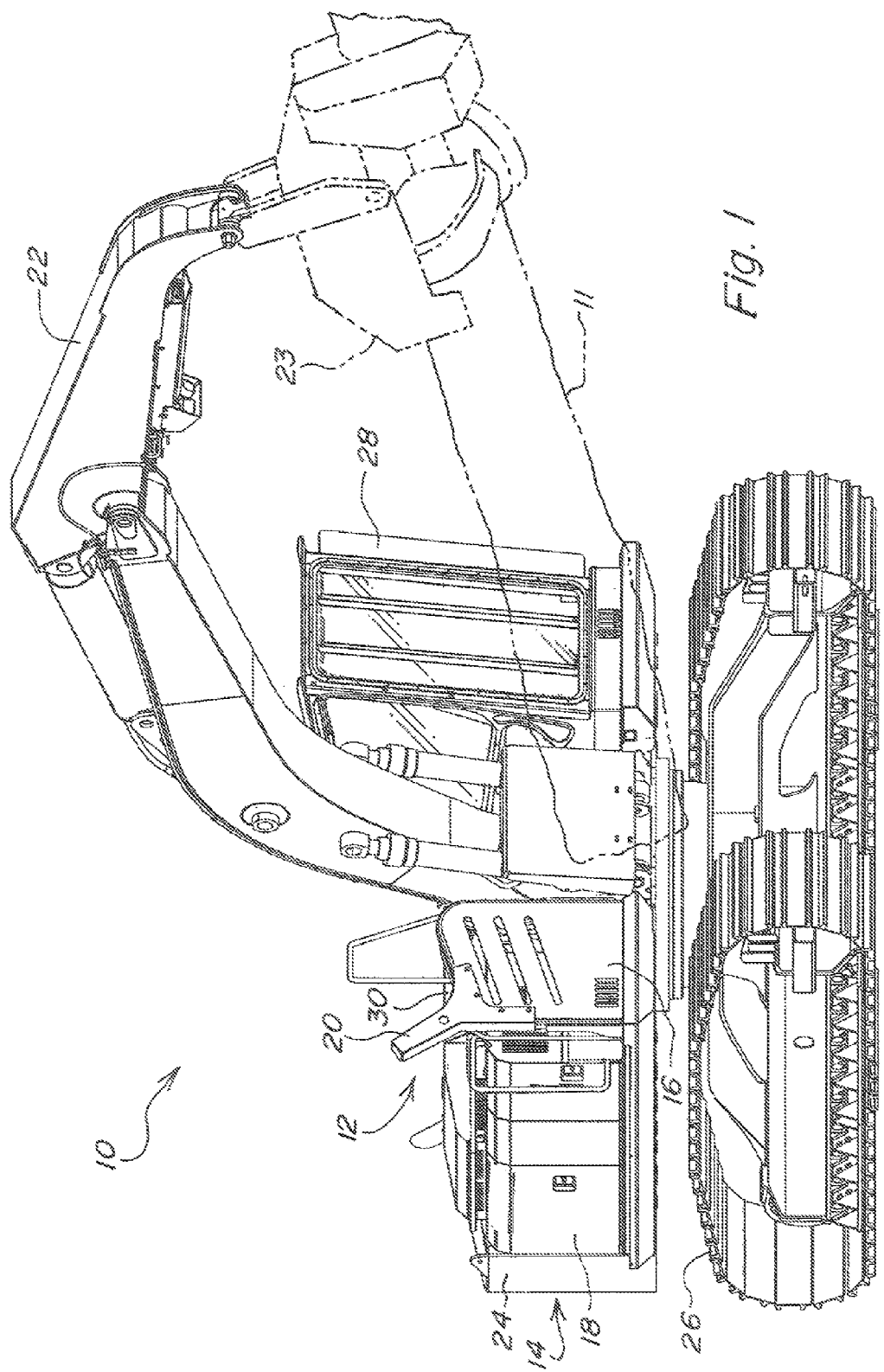
FIG. 1 is a perspective view of a forestry work machine with a log deflector mounted to the right side of the machine.

Referring to FIG. 1, an exemplary forestry work machine 10 has a log deflector 12 for deflecting away from a carrier 14 of the machine 10 a log 11 held by the machine 10. The log deflector 12 may comprise a base portion 16 attached to a side 18 (e.g., right side in FIG. 1) of the carrier 14 and an accessory portion 20 projecting laterally outwardly from and removably attached to the base portion 16.

The forestry work machine 10 may be, for example, a forestry swing machine. In such a case, an articulated boom 22 for maneuvering a work tool 22 (e.g., a tree harvester head) at the end thereof may be attached to a super-structure 24 rotatably mounted on a carriage 26, the super-structure 24 and the carriage 26 exemplarily providing the carrier 14. The log deflector 12 may be mounted on the side of the carrier 26 opposite from a cab 28 for blocking a log 11 held by the work tool 22 from impacting the chassis 30 of the super-structure 24.

Figure 2A:
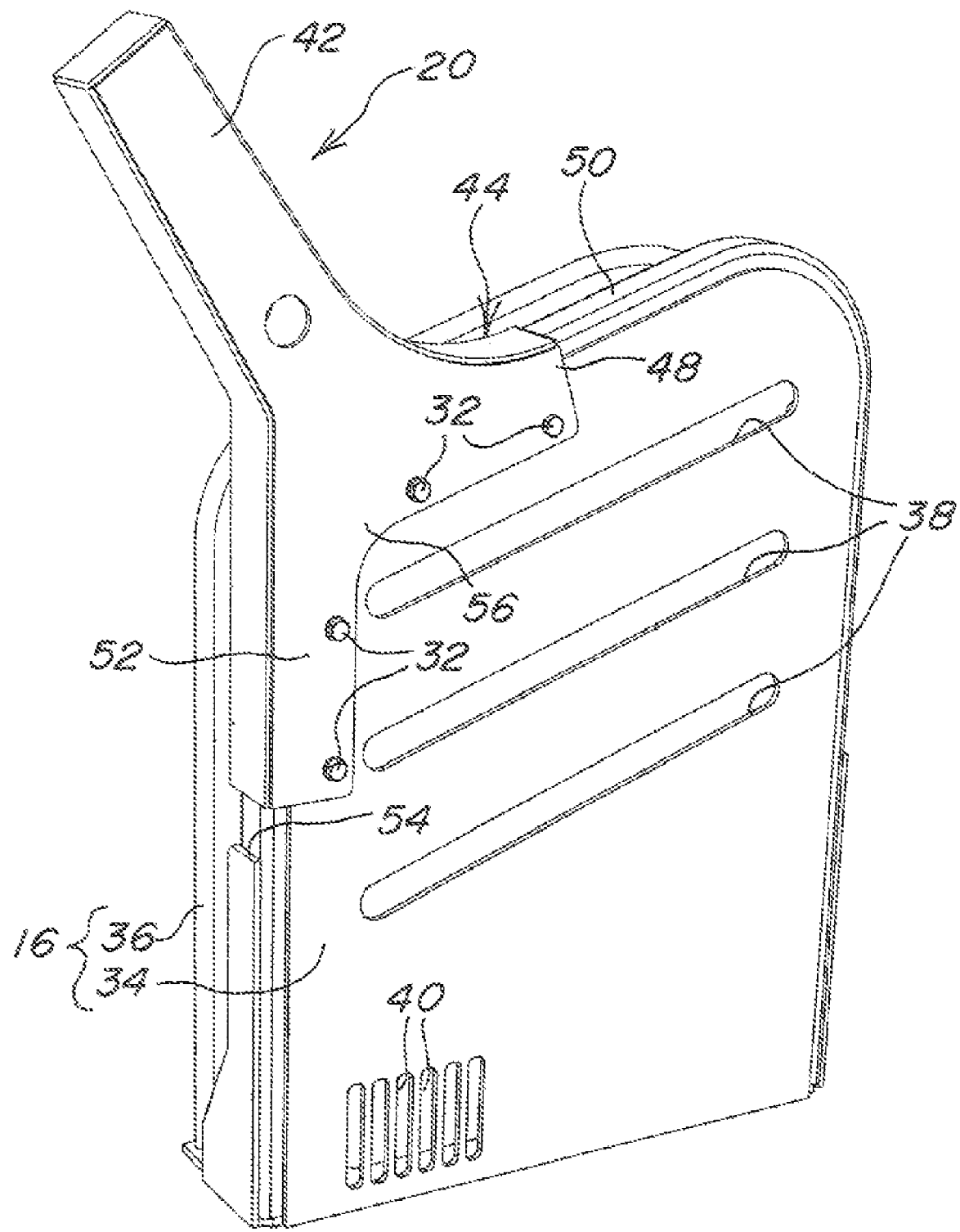
FIGS. 2a and 2b are perspective and front elevation views, respectively, showing the log deflector having a base portion and an accessory portion projecting from and removably attached to the base portion.
Figure 2B:
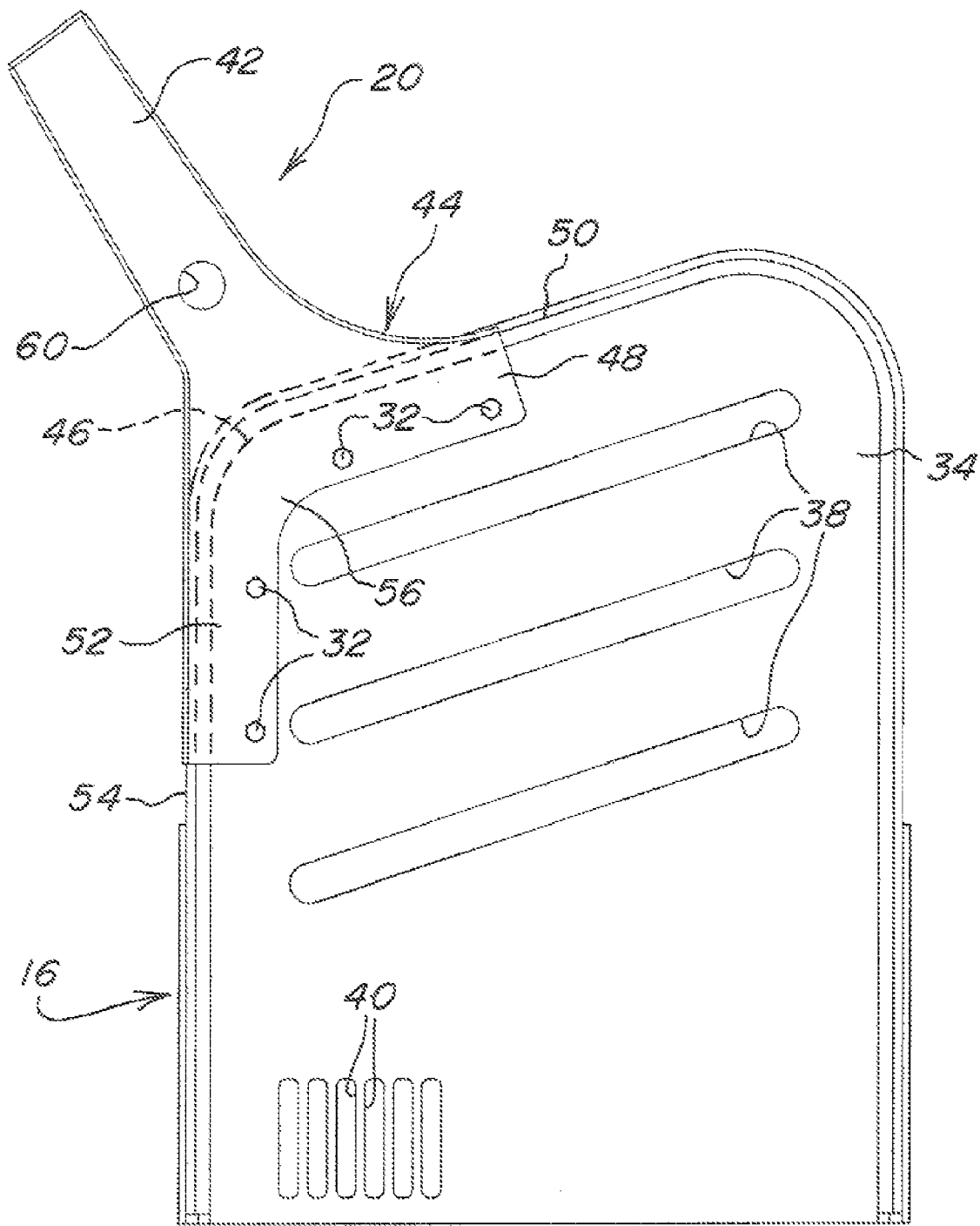

Referring to FIGS. 2a and 2b, the log deflector 12 is shown with the accessory portion 20 attached to the base portion 16. A number of fasteners 32 (e.g., four) may removably attach the accessory portion 20 to the base portion 16.

The base portion 16 may have a laterally extending panel 34 and a hand rail 36 fixed thereto behind the panel 34. The panel 34 is attached to the super-structure 24 of the carrier and positioned at the side 18 to provide protection for the super-structure 24. A number of larger slots 38 and smaller slots 40 may be formed in the panel 34 to reduce wind resistance, among other possible uses.

The accessory portion 20 may have a post 42 and a post mount 44 removably attached to the panel 34 of the base portion 16. The post 42 may be attached to the post mount 44 so as to angle upwardly and laterally outwardly away from a corner 46 of the panel 34.

The post mount 44 may comprise a first wing 48 removably attached to the panel 34 along a top edge 50 of the panel 34 and a second wing 52 removably attached to the panel 34 along a laterally outer side edge 54 of the panel 34. The first and second wings 48, 52 may join to define a junction 56 from which the post 42 angles upwardly and laterally outwardly. As such, the accessory portion 20 may be generally Y-shaped. When the accessory portion 20 is attached to the base portion 16, the junction 56 may be located at the laterally outer corner 46 of the panel.

Figure 3A:
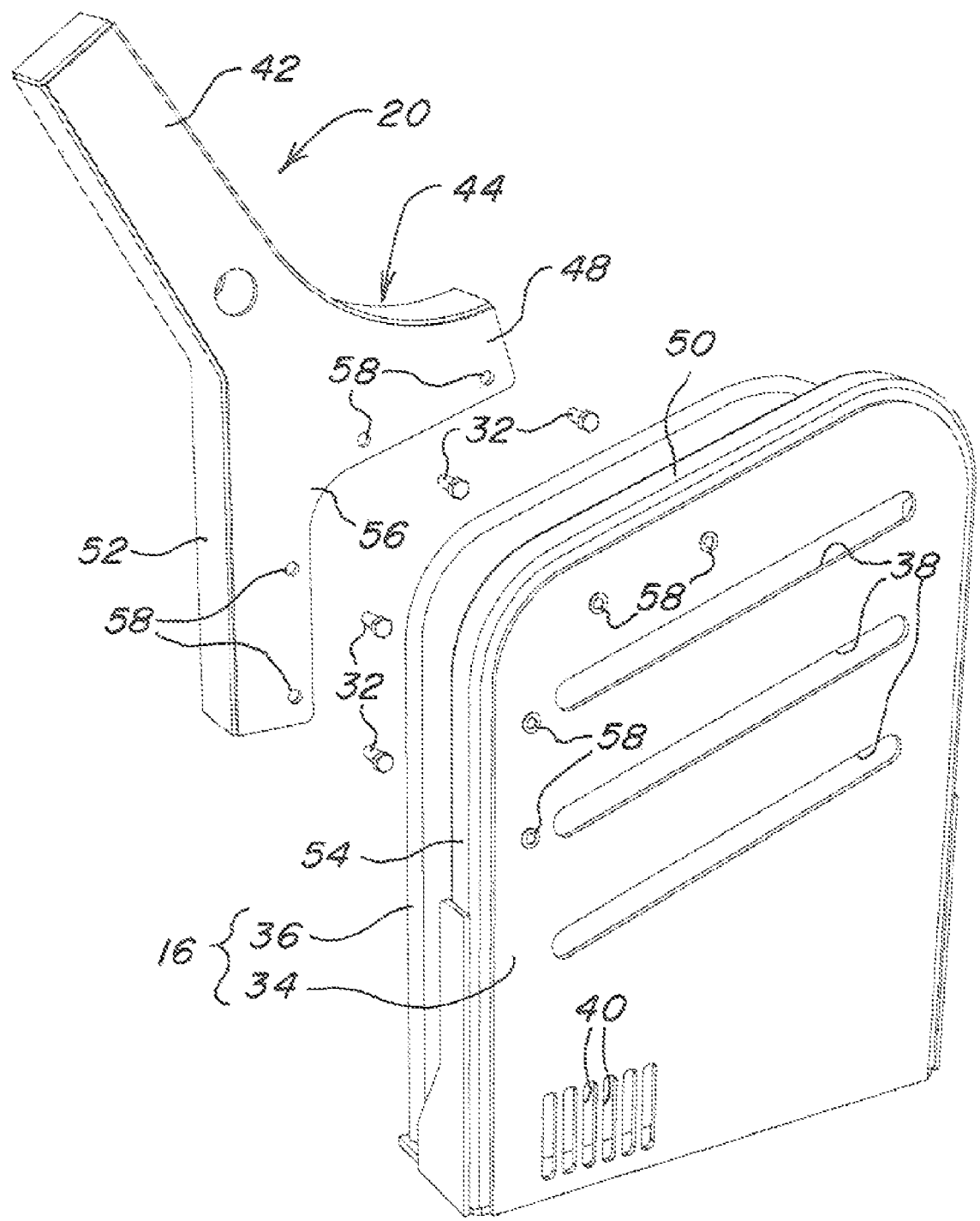
FIGS. 3a and 3b are perspective and front elevation exploded views, respectively, showing removal of the accessory portion from the base portion.
Figure 3B:
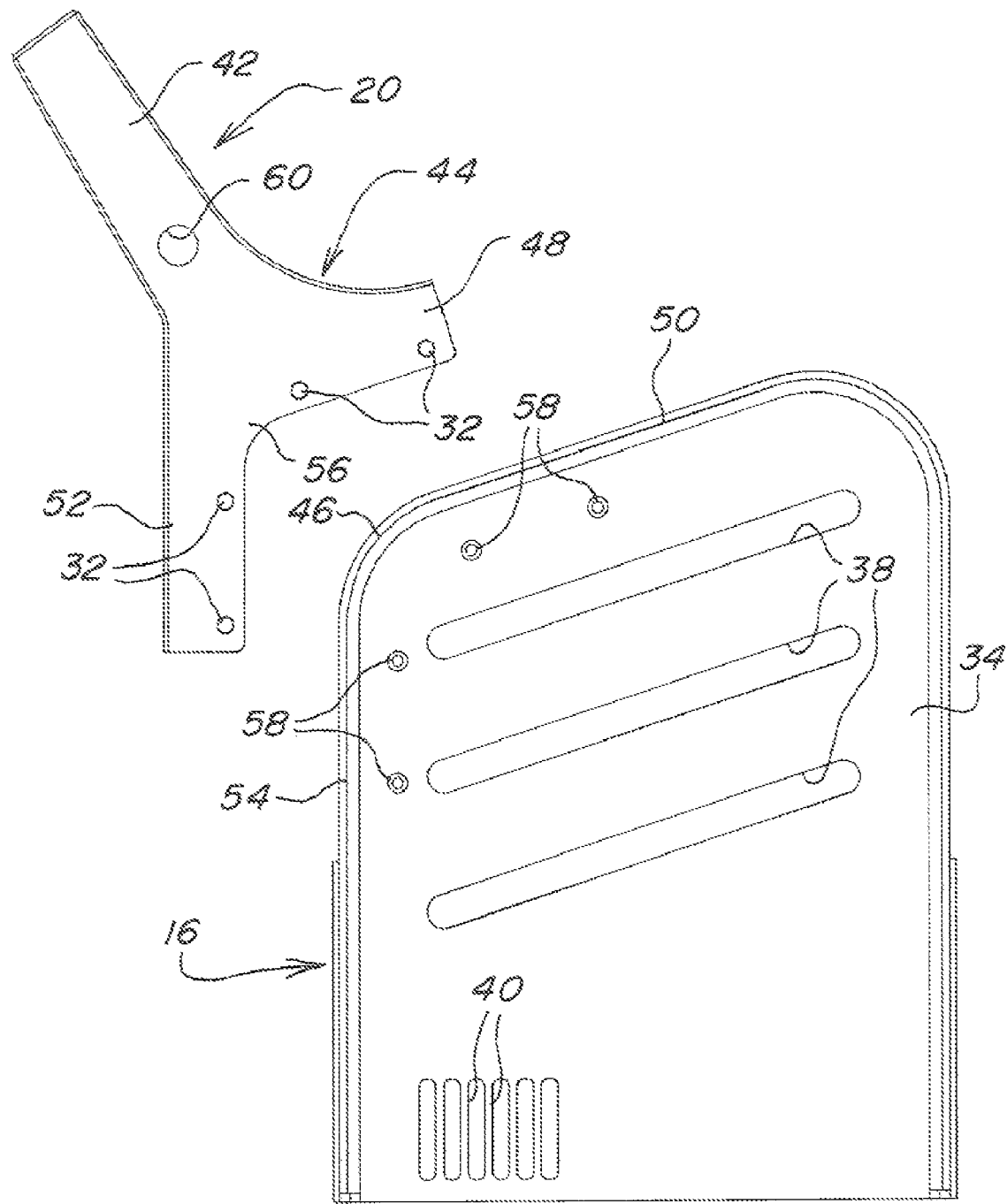

A number of fasteners 32 may be used to removably attach the first wing 48 to the panel 34 along the top edge 50 and the second wing 52 to the panel 34 along the side edge 54. Illustratively, there may be two fasteners 32 for each wing 48, 52. To receive each fastener 32, there may be corresponding fastener-receiving holes 58 (FIGS. 3a and 3b) formed in the wings 48, 52 and the panel 34 along the edges 50, 54. The fasteners 32 may be bolts, pins, or the like.

A hole 60 may be formed in the post 42 near the junction 56. This hole 60 may be used by a lifting device for lifting the accessory portion 20 during manufacturing or removal and re-attachment of the accessory portion 20.

The accessory portion 20 may be made of, for example, steel plates formed and welded to one another.

In operation, the accessory portion 20 may be joined to the panel 34 by extending the fasteners 32 through the respective fastener-receiving holes 58. The accessory portion 20 may be removed from the panel 34 by removing the fasteners 32 from the holes 58. Removal may involve removing fasteners 32 from each of the wings 48, 52 enabling removal of the post mount 44 from the panel 34. The post mount 44 may be removed from the panel 34 by removal of the first wing 48 from the top edge 50, the second wing 52 from the side edge 54, and the junction 56 from the corner 46. Afterwards, the accessory portion 20 may be re-attached to the based panel 34.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A forestry work machine, comprising:
   a carrier comprising a front having a boom extending therefrom, a rear, and laterally opposite sides, and
   a log deflector for deflecting away from the carrier a log held by the forestry work machine, the log deflector comprising a laterally extending panel attached to the carrier and positioned at one of the sides of the carrier and an accessory portion projecting laterally outwardly from the panel so as to extend the log deflecting capability of the log deflector laterally beyond the panel and removably attached to the panel with at least one fastener of the log deflector such that the accessory portion is removable from the panel to reduce the a width of the forestry work machine and re-attachable to the panel, the accessory portion comprises a post and a post mount removably attached to the panel with the at least one fastener, and the post is attached to the post mount so as to angle upwardly and laterally outwardly away from the panel, the post mount comprises a first wing removably attached to the panel along a length of a top edge of the panel and a second wing removably attached to the panel along a length of a laterally outer side edge of the panel.

2. The forestry work machine of claim 1, wherein the at least one fastener comprises a bolt.

3. The forestry work machine of claim 1, wherein the at least one fastener comprises a plurality of fasteners removably attaching the accessory portion to the panel.

4. The forestry work machine of claim 1, wherein said first wing and said second wing join at a junction, said junction being located at a laterally outward corner of said panel.

5. The forestry work machine of claim 1, wherein the first and second wings join to define a junction from which the post angles upwardly and laterally outwardly, the junction located at a laterally outer corner of the panel.

6. The forestry work machine of claim 5, wherein the at least one fastener comprises a first fastener removably attaching the first wing to the panel along the top edge thereof and a second fastener removably attaching the second wing to the panel along the side edge thereof.

7. The forestry work machine of claim 1, wherein the accessory portion is generally Y-shaped.

8. The forestry work machine of claim 1, wherein the accessory portion is located at a laterally outer corner of the panel.

9. The forestry work machine of claim 1, wherein the post mount is positioned at an upper, laterally outward corner of the panel such that the post extends upwardly and laterally outwardly away from the corner.

10. The forestry work machine of claim 5, wherein the panel is upright and comprises a periphery comprising the top edge, the laterally outer side edge, a laterally inner side edge, and a bottom edge, the laterally inner and outer side edges extend between the top and bottom edges, the laterally outer corner is positioned between the top edge and the laterally outer side edge, the panel comprises a front face surrounded by the periphery, and portions of the first and second wings are fastened to the front face.

11. The forestry work machine of claim 1, wherein the carrier comprises a carriage, and super-structure rotatably mounted on the carriage, and the boom attached to the super-structure, and the log deflector is mounted on the super structure laterally opposite from a cab of the super structure.

* * * * *